(12) United States Patent
Oomura

(10) Patent No.: US 11,254,106 B2
(45) Date of Patent: Feb. 22, 2022

(54) MACHINING SYSTEM AND MACHINING METHOD

(71) Applicant: FANUC CORPORATION, Yamanashi (JP)

(72) Inventor: Jun Oomura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 108 days.

(21) Appl. No.: 16/528,844

(22) Filed: Aug. 1, 2019

(65) Prior Publication Data

US 2020/0094533 A1    Mar. 26, 2020

(30) Foreign Application Priority Data

Sep. 20, 2018  (JP) .............................. JP2018-176183

(51) Int. Cl.
| | | |
|---|---|---|
| B05C 9/14 | (2006.01) | |
| B32B 27/08 | (2006.01) | |
| B24D 3/28 | (2006.01) | |
| B32B 7/12 | (2006.01) | |
| H01B 13/00 | (2006.01) | |
| B05C 9/12 | (2006.01) | |

(52) U.S. Cl.
CPC ............... *B32B 27/08* (2013.01); *B05C 9/12* (2013.01); *B05C 9/14* (2013.01); *B24D 3/28* (2013.01); *B32B 7/12* (2013.01); *H01B 13/003* (2013.01); *H01B 13/0023* (2013.01)

(58) Field of Classification Search
USPC .......................... 118/641–643, 325; 425/501
See application file for complete search history.

(56) References Cited

U.S. PATENT DOCUMENTS

| | | | | |
|---|---|---|---|---|
| 4,211,591 A | * | 7/1980 | Stiles ...................... | B29C 70/20 |
| | | | | 156/180 |
| 5,364,258 A | * | 11/1994 | Buckley .............. | B29C 35/0266 |
| | | | | 156/166 |
| 7,955,548 B2 | * | 6/2011 | Buckley .................. | B29B 11/16 |
| | | | | 264/496 |
| 2018/0264719 A1 | | 9/2018 | Rolland et al. | |
| 2019/0283316 A1 | | 9/2019 | Rolland et al. | |

FOREIGN PATENT DOCUMENTS

| | | |
|---|---|---|
| CN | 106057368 A | 10/2016 |
| CN | 108139665 A | 6/2018 |
| DE | 102016117711 A1 | 3/2018 |
| JP | S64-56989 U | 4/1989 |
| JP | 2010-105106 A | 5/2010 |
| JP | 2015-147279 A | 8/2015 |
| WO | 2017/112653 A1 | 6/2017 |

* cited by examiner

*Primary Examiner* — Yewebdar T Tadesse
(74) *Attorney, Agent, or Firm* — Maier & Maier, PLLC

(57) ABSTRACT

A machining system includes an application device that applies a photocurable resin to surfaces of a plurality of linear objects provided in a workpiece; a curing device that brings the linear objects, to which the photocurable resin has been applied by the application device, into close contact with each other in radial directions and that radiates light onto the photocurable resin, which has been applied to the linear objects brought into close contact, thus curing the photocurable resin; and a machining device that machines the workpiece, in which the plurality of linear objects have been bound together through the curing of the photocurable resin performed by the curing device.

3 Claims, 5 Drawing Sheets

MACHINING SYSTEM AND MACHINING METHOD

CROSS-REFERENCE TO RELATED APPLICATIONS

This application is based on Japanese Patent Application No. 2018-176183, the content of which is incorporated herein by reference.

FIELD

The present invention relates to a machining system and a machining method.

BACKGROUND

In the related art, in a case in which a workpiece to be machined is provided with a plurality of linear objects, such as cables, these linear objects are manually bound by using a binding band, and the workpiece that is in a state in which the linear objects are bound together so as not to move is mounted on a machine tool.

SUMMARY

One aspect of the present invention is directed to a machining system including: an application device that applies a photocurable resin to surfaces of a plurality of linear objects provided in a workpiece; a curing device that brings the linear objects, to which the photocurable resin has been applied by the application device, into close contact with each other in radial directions and that radiates light onto the photocurable resin, which has been applied to the linear objects brought into close contact, thus curing the photocurable resin; and a machining device that machines the workpiece in which the plurality of linear objects have been bound together through the curing of the photocurable resin performed by the curing device.

Another aspect of the present invention is directed to a machining method including: applying a photocurable resin to surfaces of a plurality of linear objects provided in a workpiece; bringing the linear objects, to which the photocurable resin has been applied, into close contact with each other in radial directions and radiating light onto the photocurable resin, which has been applied to the linear objects brought into close contact, thus curing the photocurable resin; and machining the workpiece in which the plurality of linear objects have been bound together through the curing of the photocurable resin.

DETAILED DESCRIPTION

A machining system 1 according to one embodiment of the present invention will be described below with reference to the drawings.

Figure 1:
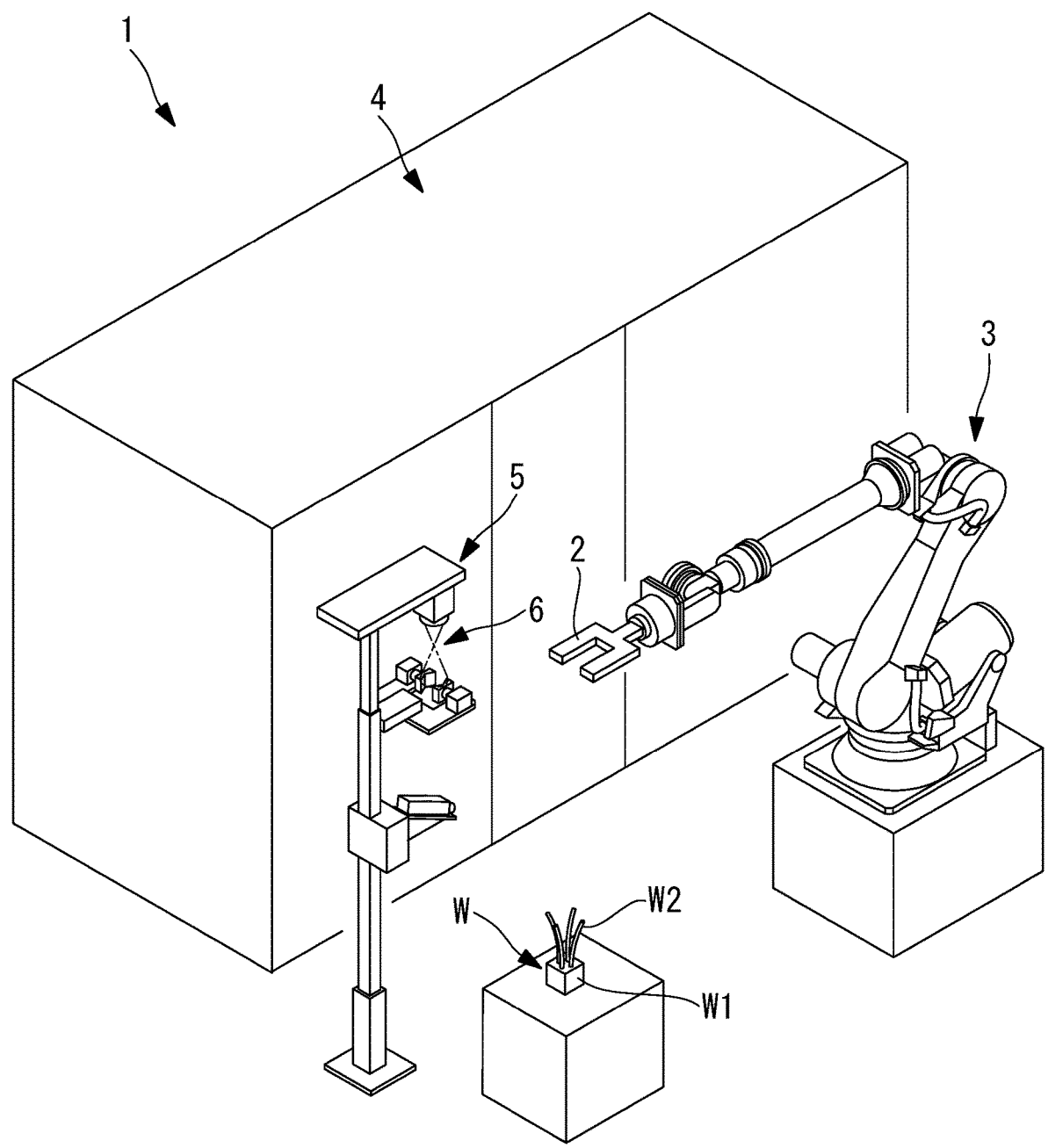
FIG. 1 is a perspective view showing a machining system according to one embodiment of the present invention.
Figure 3:
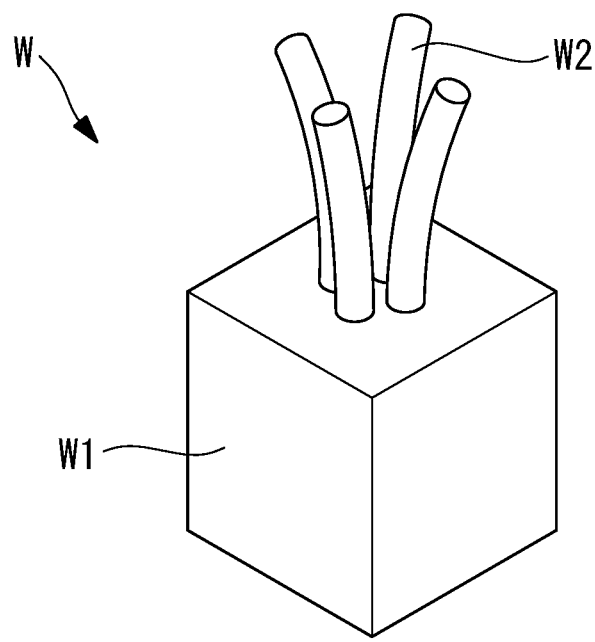
FIG. 3 is a perspective view showing a workpiece used in the machining system shown in FIG. 1.

The machining system 1 of this embodiment is a system for machining a workpiece body W1 of a workpiece W in which a plurality of cables (linear objects) W2 are provided in the workpiece body W1, as shown in FIG. 3, and, as shown in FIG. 1, includes: a robot 3 that has, at a wrist tip thereof, a hand 2 capable of holding the workpiece body W1; a machining device 4 that is disposed in the vicinity of the robot 3 and that machines the workpiece W; a preprocessing device 5 that bundles the plurality of cables W2 together before the machining performed by the machining device 4; and a post-processing device (removal device) 6 that separates the bundled cables W2 after the machining performed by the machining device 4.

The robot 3 is, for example, a 6-axis articulated-type robot.

The machining device 4 includes, for example, a chuck (not shown) that holds the workpiece body W1, a main shaft (not shown) that rotates the chuck, and a tool (not shown) that cuts the workpiece body W1.

The preprocessing device 5 is disposed in the vicinity of the machining device 4 and includes: an application device 7 that applies a photocurable resin (see FIG. 7) X to the surfaces of predetermined lengthwise positions of the plurality of cables W2 of the workpiece W held by the hand 2 and transferred by the robot 3; and a curing device 8 that cures the photocurable resin X by radiating ultraviolet light.

Figure 2:
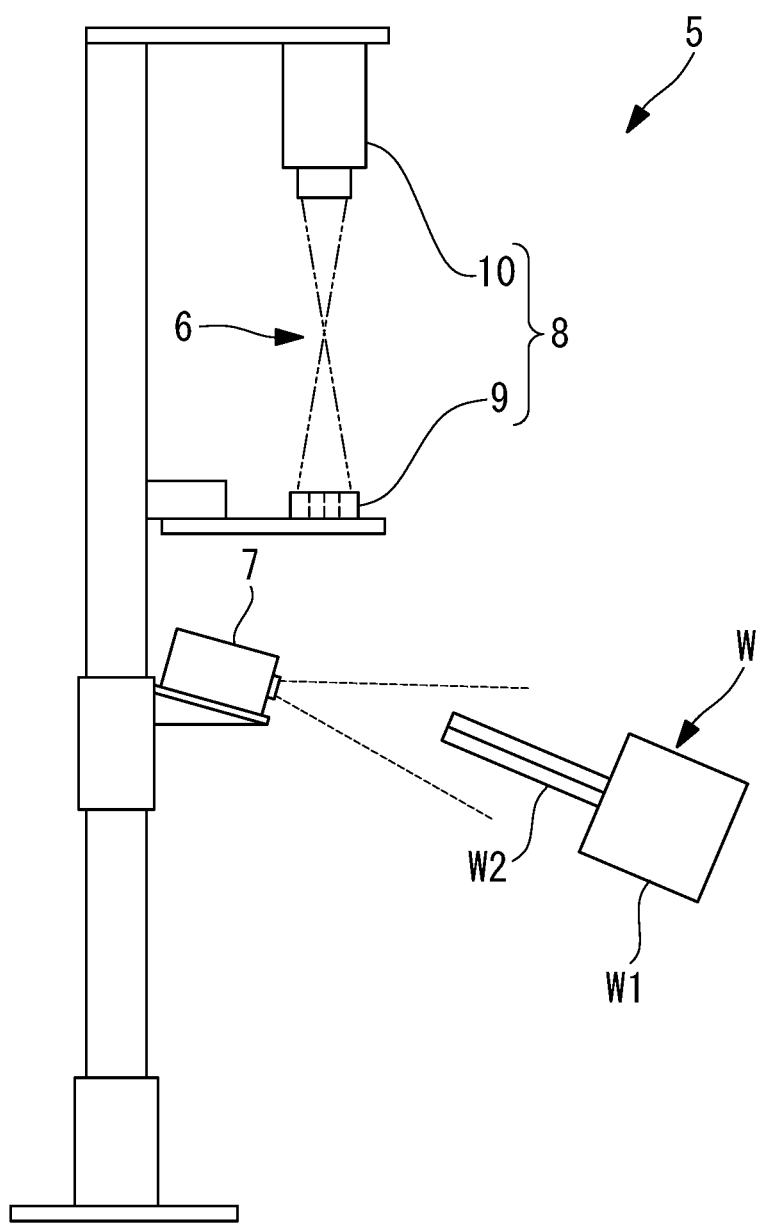
FIG. 2 is a front view showing a preprocessing device and a post-processing device in the machining system shown in FIG. 1.

As shown in FIG. 2, the application device 7 is a spray device that ejects the photocurable resin X toward a predetermined region, and ejects the photocurable resin X in response to a command signal from the robot 3.

As shown in FIG. 2, the curing device 8 includes: a close-contact mechanism 9 that gathers the plurality of cables W2 of the workpiece W in radial directions, thereby bringing the surfaces of the predetermined lengthwise positions of the cables W2, to which the photocurable resin X has been applied, into contact with one another; and a light irradiation unit 10 that radiates ultraviolet light onto the photocurable resin X on the surfaces of the predetermined lengthwise positions of the cables W2, which have been brought into contact with one another by the close-contact mechanism 9, thus curing the photocurable resin X.

Figure 4:
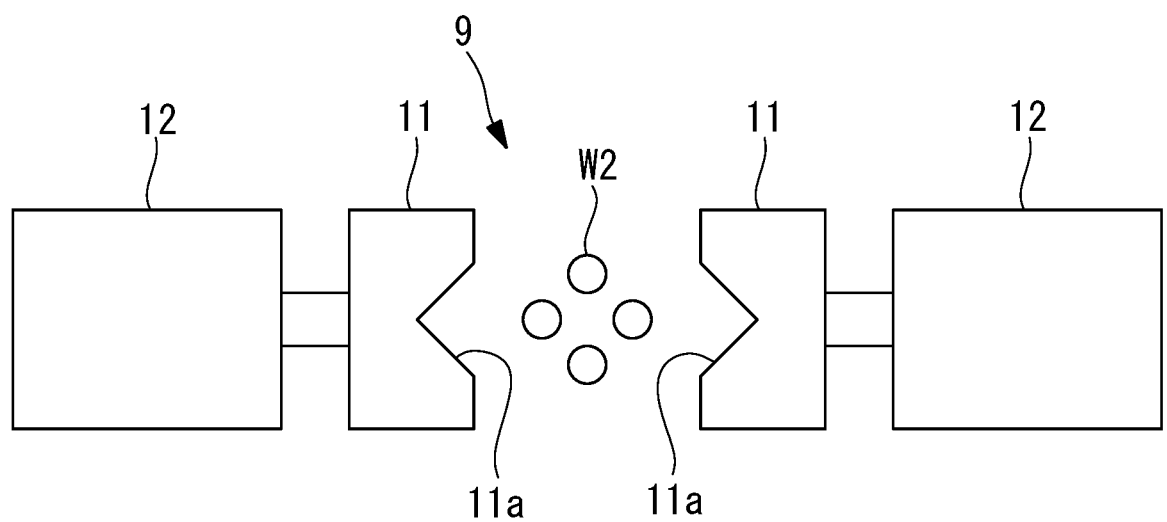
FIG. 4 is a plan view for explaining a close-contact mechanism in the machining system shown in FIG. 1.
Figure 5:
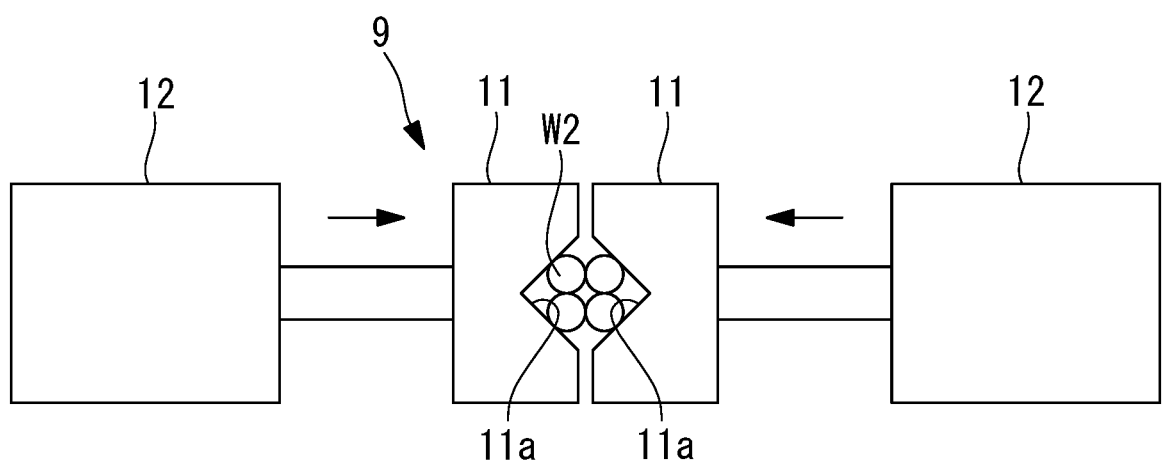
FIG. 5 is a plan view showing a state in which cables are gathered together in radial directions by the close-contact mechanism shown in FIG. 4.
Figure 6:
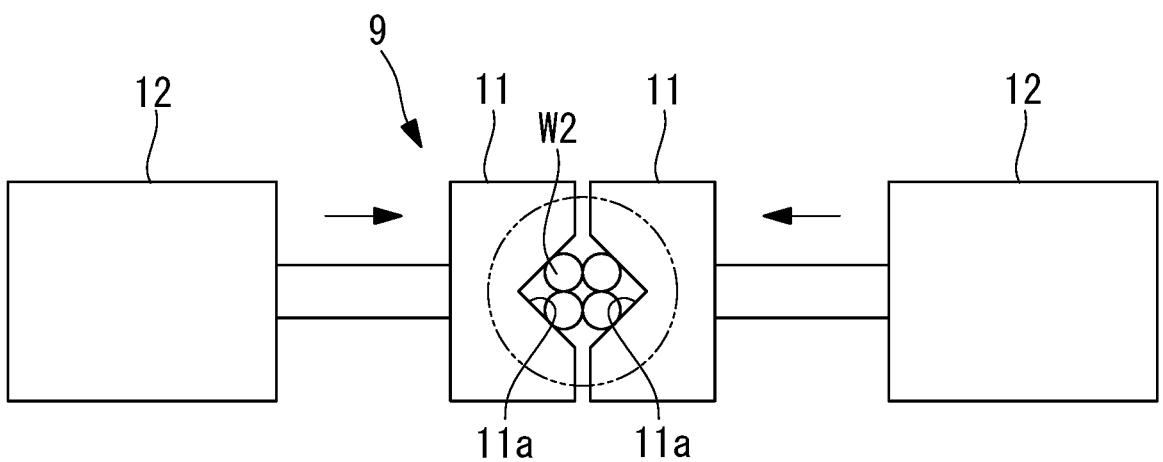
FIG. 6 is a plan view showing a step of radiating ultraviolet light onto a photocurable resin on the cables, which are gathered together by the close-contact mechanism shown in FIG. 4.

As shown in FIGS. 4 to 6, the close-contact mechanism 9 includes, for example, a pair of holding members 11 that are disposed so as to be opposed to each other, and cylinders 12 that move the holding members 11 in such directions as to be close to or away from each other. V-shaped grooves 11a are respectively provided on opposed surfaces of the holding members 11. The V-shaped grooves 11a have such shapes and sizes as to define, in a state in which the holding members 11 are moved so as to be the closest to each other, a cross-sectional space capable of perfectly accommodating the plurality of cables W2, which are in such a state as to be in close contact with one another in the radial directions.

As shown in FIG. 2, the light irradiation unit 10 includes a light source (not shown) that produces ultraviolet light and an optical system (not shown) that focuses the ultraviolet light produced by the light source. The ultraviolet light that has passed through the optical system is focused at a focus position of the optical system and is then diffused. As shown in FIG. 6, the light irradiation unit 10 is formed by disposing, between the holding members 11 of the close-contact mechanism 9, the position of a light-flux diameter over which the light has spread, thus having a sufficient photon density for curing the photocurable resin X.

Figure 8:
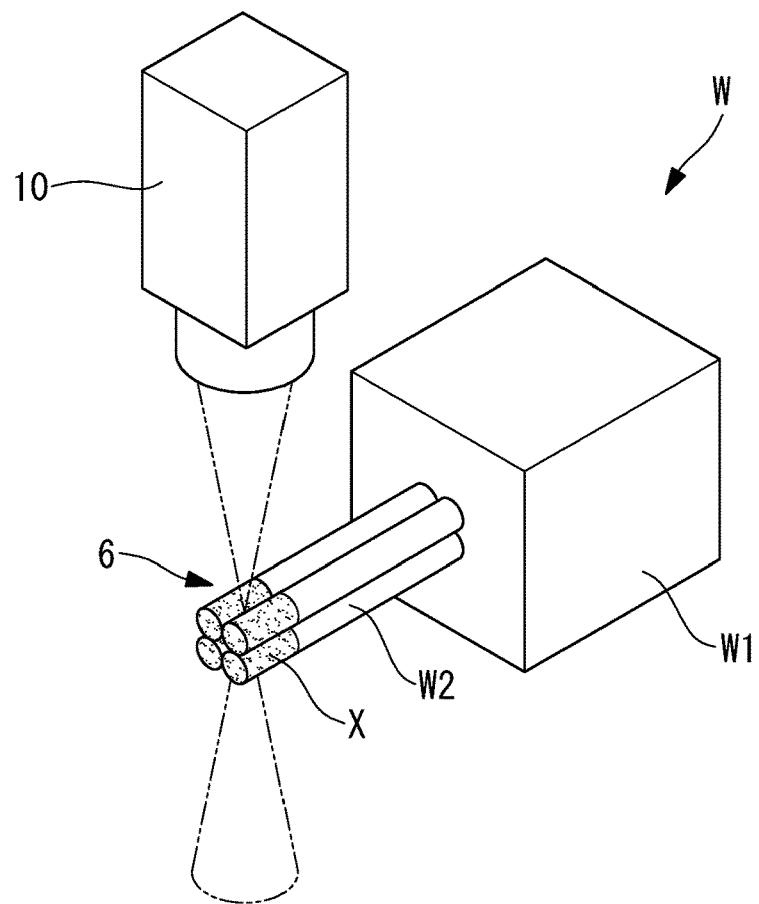
FIG. 8 is a perspective view for explaining a step of evaporating the photocurable resin by means of the post-processing device in the machining system shown in FIG. 1.

As shown in FIG. 8, the post-processing device 6 is formed of the light irradiation unit 10, which is common to the preprocessing device 5, at the position of a light-flux diameter where ultraviolet light produced by the light source of the light irradiation unit 10 is focused by the optical system, thus having a sufficient photon density for evaporating the cured photocurable resin X.

The machining method by using the thus-configured machining system 1 of this embodiment will be described below.

In the machining method of this embodiment, the workpiece W held by the hand 2 is moved to the preprocessing device 5 by the robot 3, the cables W2 of the workpiece W are disposed within an ejection region to which the photocurable resin X is to be ejected by the application device 7 of the preprocessing device 5, and the robot 3 issues a command to the application device 7, thereby ejecting the photocurable resin X.

Accordingly, the photocurable resin X is applied to the surfaces of the predetermined lengthwise positions of the cables W2.

Next, the robot 3 is operated to move the workpiece W to the close-contact mechanism 9 of the preprocessing device 5. In response to a command from the robot 3, the cylinders 12 of the close-contact mechanism 9 are operated to move the pair of holding members 11 away from each other, as shown in FIG. 4, and the cables W2 of the workpiece W are disposed between the separated holding members 11, along the V-shaped grooves 11a. In this state, in response to a command from the robot 3, the cylinders 12 of the close-contact mechanism 9 are operated to move the pair of holding members 11 close to each other, as shown in FIG. 5, thereby making the plurality of cables W2 close to one another in radial directions in a space surrounded by the V-shaped grooves 11a of the two holding members 11.

Figure 7:
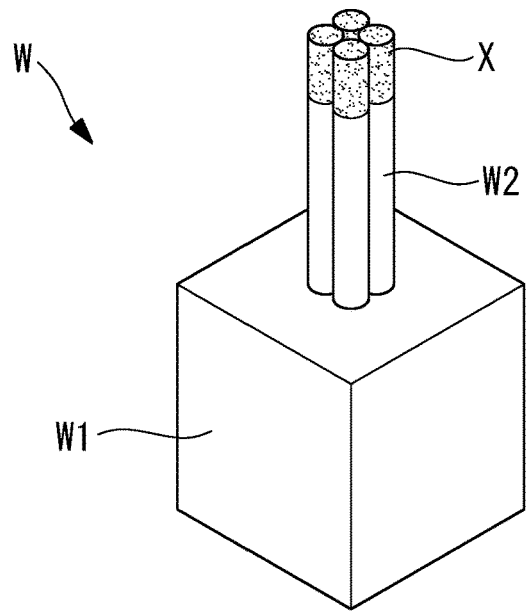
FIG. 7 is a perspective view showing a state in which the cables of the workpiece, which is shown in FIG. 3, are adhered by using the photocurable resin, with the cables being gathered together in the radial directions.

Accordingly, because the surfaces of the predetermined lengthwise positions of the cables W2, to which the photocurable resin X has been applied, are disposed in such a state as to be in contact with one another, as shown in FIG. 6, the light source of the light irradiation unit 10 is operated to radiate ultraviolet light onto the photocurable resin X. Specifically, ultraviolet light that has been diffused so as to have the predetermined photon density is radiated onto the photocurable resin X, thereby curing the photocurable resin X and fixing the plurality of cables W2 in such a state as to be bound together, as shown in FIG. 7.

Since the cables W2 each have a certain degree of rigidity in the length direction, the plurality of cables W2 are adhered to one another at one place in the length direction, thereby making it possible to sufficiently increase the rigidity of the cables W2 that have been bound together and to prevent the cables W2 from moving violently and from interfering with another portion even when the cables W2 are rotated in the machining device 4.

In this state, in response to a command from the robot 3, the cylinders 12 of the close-contact mechanism 9 are operated to move again the pair of holding members 11 away from each other, thereby releasing the cables W2. Furthermore, the robot 3 is operated to transfer the workpiece W to the machining device 4 and to cause the chuck of the machining device 4 to hold the workpiece W. Accordingly, the workpiece body W1 is machined by the machining device 4.

After completion of the machining, the robot 3 takes out the workpiece W from the machining device 4 and moves the workpiece W to the post-processing device 6. Specifically, the robot 3 is operated to move the workpiece W and dispose the cured photocurable resin X, which has fixed the plurality of cables W2, in the vicinity of the focus position of the ultraviolet light, as shown in FIG. 8. Accordingly, the cured photocurable resin X is evaporated (removed), thus releasing the adhered state and returning the cables W2 to a state where the cables W2 are not adhered.

In this way, according to the machining system 1 and the machining method of this embodiment, the workpiece W that is being held by the hand 2, which is mounted at the distal end of the robot 3, is moved to the application device 7, the close-contact mechanism 9, and the light irradiation unit 10, and the respective devices 5 and 6 are operated, thereby making it possible to fix the plurality of cables W2 in such a state as to be bound together, with the workpiece W being held by the hand 2. Accordingly, the cables W2 can be prevented from becoming obstacles at the time of machining performed by the machining device 4.

Then, after completion of the machining, the workpiece W that is being held by the hand 2 is moved to the post-processing device 6, and the adhered state thereof can be released. In this case, the cables W2 can be returned to a state where the cables W2 are not adhered, with the workpiece W being held by the hand 2.

Specifically, according to the machining system 1 and the machining method of this embodiment, there is an advantage in that complex work, such as tying a binding band, is not required, and work of bundling the plurality of cables W2, which are provided in the workpiece W, so as not to move is automated, thus making it possible to reduce the cost and the time required.

Note that, in this embodiment, although a description has been given of an example workpiece W that is provided with four cables W2 as linear objects, the linear objects are not limited to the cables W2, and the number of linear objects is not limited to four.

As a result, the above-described embodiment leads to the following aspects.

One aspect of the present invention is directed to a machining system including: an application device that applies a photocurable resin to surfaces of a plurality of linear objects provided in a workpiece; a curing device that brings the linear objects, to which the photocurable resin has been applied by the application device, into close contact with each other in radial directions and that radiates light onto the photocurable resin, which has been applied to the linear objects brought into close contact, thus curing the photocurable resin; and a machining device that machines the workpiece in which the plurality of linear objects have been bound together through the curing of the photocurable resin performed by the curing device.

According to this aspect, when a workpiece that is provided with a plurality of linear objects is supplied, the application device applies a photocurable resin to the surfaces of the linear objects, and the curing device radiates light onto the photocurable resin in a state in which the plurality of linear objects are in close contact in radial directions, thereby curing the photocurable resin. Accordingly, the plurality of linear objects are bound together. The workpiece, in which the linear objects are bundled so as not to move, can be easily machined by the machining device.

In this case, unlike complex work of binding a plurality of linear objects together with a binding band in a state in which the linear objects are bundled together, according to this aspect, work is easily automated through a simple step of applying a photocurable resin and radiating light, thus bundling a plurality of linear objects so as not to move, thereby making it possible to reduce the cost and time required for machining.

The machining system according to the above-described aspect may further include a removal device that removes the cured photocurable resin after completion of the machining of the workpiece performed by the machining device.

With this configuration, the photocurable resin, which adheres the plurality of linear objects for machining, is removed, thus making it possible to return the plurality of linear objects to a separated state.

Furthermore, in the above-described aspect, the curing device and the removal device may be provided with a common light source that produces ultraviolet light; the curing device may radiate the ultraviolet light, which is produced by the light source, onto the photocurable resin at a position where the ultraviolet light is diffused; and the removal device may radiate the ultraviolet light, which is produced by the light source, onto the photocurable resin at a position where the ultraviolet light is focused.

With this configuration, the photocurable resin is irradiated with the ultraviolet light, which is produced by the light source, at a position where the ultraviolet light is diffused, thereby making it possible to cure the photocurable resin and to adhere the plurality of linear objects together, and, after machining, the photocurable resin is irradiated with the ultraviolet light, which is produced by the light source, at a position where the ultraviolet light is focused, thereby making it possible to evaporate and remove the photocurable resin. By using the common light source, the system can be reduced in size.

Furthermore, the machining system according to the above-described aspect may further include a robot in which a hand that holds the workpiece is mounted at a distal end thereof, wherein the robot may move the workpiece held by the hand, among the application device, the curing device, and the machining device.

With this configuration, the workpiece held by the hand, which is mounted at the distal end of the robot, can be sequentially moved, through the operation of the robot, to the application device, the curing device, and the machining device, and the workpiece can be machined.

Another aspect of the present invention is directed to a machining method including: applying a photocurable resin to surfaces of a plurality of linear objects provided in a workpiece; bringing the linear objects, to which the photocurable resin has been applied, into close contact with each other in radial directions and radiating light onto the photocurable resin, which has been applied to the linear objects brought into close contact, thus curing the photocurable resin; and machining the workpiece in which the plurality of linear objects have been bound together through the curing of the photocurable resin.

According to the present invention, an advantageous effect is afforded in that work of bundling a plurality of linear objects provided in a workpiece so as not to move is automated, thus making it possible to reduce the cost and the time required.

The invention claimed is:

1. A machining system comprising:
    an application device that applies a photocurable resin to surfaces of a plurality of linear objects provided in a workpiece;
    a curing device that brings the linear objects, to which the photocurable resin has been applied by the application device, into close contact with each other in radial directions and that radiates light onto the photocurable resin, which has been applied to the linear objects brought into close contact, thus curing the photocurable resin;
    a machining device that machines the workpiece in which the plurality of linear objects have been bound together through the curing of the photocurable resin performed by the curing device; and
    a removal device that radiates light onto the cured photocurable resin and removes the cured photocurable resin after completion of the machining of the workpiece performed by the machining device;
    wherein the curing device and the removal device are provided with a common light source that produces ultraviolet light.

2. The machining system according to claim 1,
    wherein the curing device radiates the ultraviolet light, which is produced by the common light source, onto the photocurable resin at a position where the ultraviolet light is diffused; and
    the removal device radiates the ultraviolet light, which is produced by the common light source, onto the photocurable resin at a position where the ultraviolet light is focused.

3. The machining system according to claim 1, further comprising a robot in which a hand that holds the workpiece is mounted at a distal end thereof,
    wherein the robot moves the workpiece held by the hand, among the application device, the curing device, and the machining device.

* * * * *